Aug. 25, 1970     O. V. INGRUBER ET AL     3,525,667

PROCESS AND PRODUCT

Filed Oct. 7, 1966     3 Sheets-Sheet 1

INVENTORS
OTTO V. INGRUBER
WILLIAM B. CRANFORD
GEORGE L. AVON
JAMES K. WATSON
JACK L. NEAL

BY *Martin J Marcus*

ATTORNEY

INVENTORS
OTTO V. INGRUBER
WILLIAM B. CRANFORD
GEORGE L. AVON
JAMES K. WATSON
JACK L. NEAL

BY *Martin J Marcus*

ATTORNEY

TABLE I

COOKING CONDITIONS WITH AND WITHOUT COMBINED $SO_2$ TO ROE NO. 3.5

| | PRE – SULFONATION | | | | SULFONATION + HYDROLYSIS | | | | | | |
|---|---|---|---|---|---|---|---|---|---|---|---|
| | %$SO_2$ | °C | PSIG | HOURS | %$SO_2$ | g$Na_2O$/l | % COMB. $SO_2$ | °C | PSIG | HOURS | ROE NO. |
| (1) | 22 | 95 | 220 | 8 | 5 | – | – | 115 | (90)$^a$ | 3:30 | 3.5 |
| (1) | 22 | 95 | 220 | 8 | 5 | – | – | 145 | (170)$^a$ | 0:30 | 3.5 |
| (1) | – | – | – | – | 36$^b$ | – | – | 95 | (350)$^a$ | 7:15 | 4.6 |
| (2) | – | – | – | – | 5.5 | 10.0 | 1.15 | 147 | 85 | 8:15 | 3.0 |
| (2) | – | – | – | – | 7.0 | 5.7 | 0.65 | 130 | 95 | 10:00 | 3.0 |
| (2) | – | – | – | – | 15.0 | 3.5 | 0.40 | 127 | 150 | 5:50 | 3.0 | a FROM VAPOUR PRESSURE DATA
b TWO PHASE SYSTEM WITH APPROX. 40 WT. % OF $SO_2$ IN AQUEOUS PHASE
(1) L. STOCKMAN, SVENSK PAPPERSTIDNING 64 (1961), P. 710
(2) PRESENT INVENTION

FIG. 5

TABLE II

EFFECT OF COMBINED $SO_2$ ON ACETATE SOLUTION PURITY

| COOKING CONDITIONS | | | | | ACETYLATION TEST | | | |
|---|---|---|---|---|---|---|---|---|
| % COMB. $SO_2$ | % TOTAL $SO_2$ | MAX. TEMP. | PRESS. PSIG | TIME HRS. | TURB. | COL. | 90° SCATTER | VISC. * |
| 1.15 | 5.5 | 147 | 85 | 8:15 | 12.4 | 24.1 | 118 | 84 |
| 0.65 | 7.0 | 130 | 95 | 10:15 | 8.0 | 15.1 | 60.6 | 100 |
| 0.4 | 15.0 | 127 | 150 | 5:50 | 6.0 | 12.8 | 31 | 100 |

* AFTER CONSTANT ACETYLATION TIME.

NOTE: % COMBINED $SO_2$ × 0.312 = NORMALITY OF BASE CATION.

FIG. 6

United States Patent Office

3,525,667
Patented Aug. 25, 1970

3,525,667
PROCESS AND PRODUCT
Otto V. Ingruber, Vankleek Hill, Ontario, William B. Cranford, Hawkesbury, Ontario, George L. Avon, Gatineau, Quebec, James K. Watson, Pointe Claire, Quebec, and Jack L. Neal, Baie D'Urfe, Quebec, Canada, assignors to Canadian International Paper Company, Montreal, Quebec, Canada, a corporation of Canada
Filed Oct. 7, 1966, Ser. No. 585,036
Int. Cl. D21c 7/12; G01n
U.S. Cl. 162—62                                   6 Claims

ABSTRACT OF THE DISCLOSURE

A process of cooking lignocellulosic raw material in sulfite liquor in the manufacture of dissolving pulp, wherein combined $SO_2$, total $SO_2$ and temperature parameters are selected for optimum efficiency, the combined $SO_2$ downwardly within a range of from about 0.7% to 0.2% based on the sulfite liquor, the total $SO_2$ upwardly within a range of from about 7 to 16% based on the sulfite liquor, and the temperature downwardly within a range from about 130° C. to 120° C.

---

Figure 1:
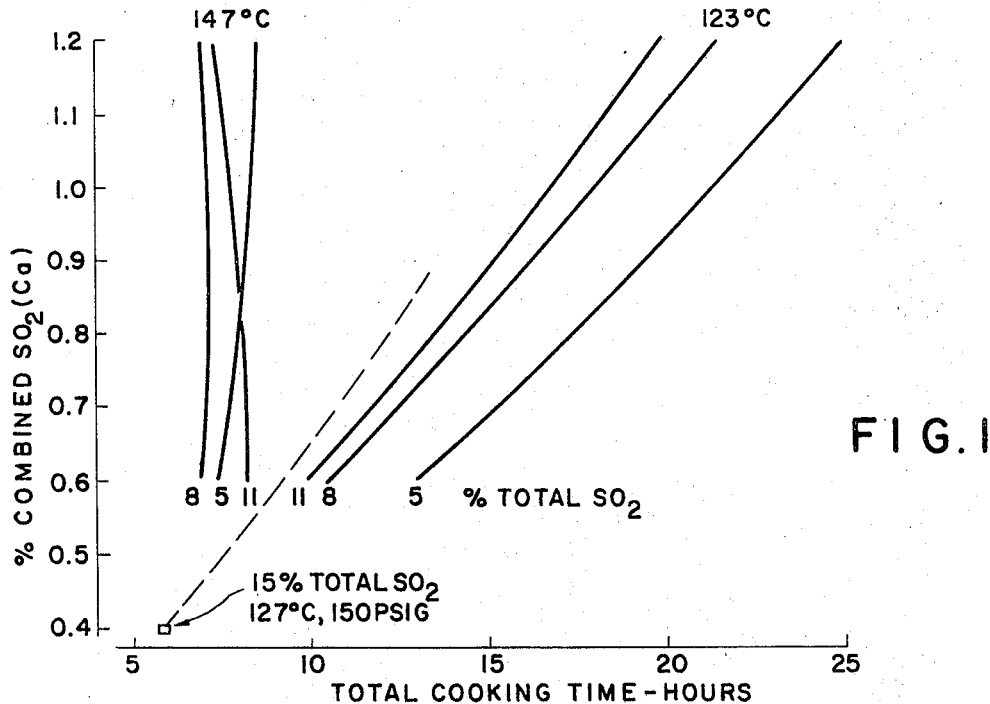

This invention relates to an acid bisulfite lignocellulose pulping process, sometimes called "the sulfite process." More particularly, it relates to the acid bisulfite cooking of wood to produce a cellulosic material or pulp particularly adapted for further use in the acetate process.

One of the well estabished methods for the preparation of cellulosic material from wood is the sulfite pulping process. This process is characterized by the exposure of wood chips to the action of bisulfites of calcium, magnesium, sodium, or ammonia in heated aqueous solutions containing excess free $SO_2$ and having correspondingly low pH values.

The subject of the present invention is an acid sulfite cooking process employing very low levels of combined $SO_2$[1], at lower than usual temperatures and higher than normal concentrations of free $SO_2$, and resulting in dissolving pulps, and particularly acetate pulps, of superior quality. While this discussion tends to emphasize use of low levels of combined $SO_2$, it must be understood that markedly beneficial effects of the process are obtained only if the temperature is lowered and the free $SO_2$ concentration is raised simultaneously.

More particularly, the present invention provides a process for the manufacture of dissolving pulp from lignocellulosic raw material comprising the step of cooking comminuted cellulosic material in acid bisulfite liquor, wherein the initial conditions of combined $SO_2$, total $SO_2$, and temperature are selected, the combined $SO_2$ within a range of from about 0.7% to 0.2% based on the sulfite liquor, the total $SO_2$ within a range of from about 7 to 16% based on the sulfite liquor, and the temperature within a range from about 130° C. to 120° C. For the purposes of this disclosure, such percentages are arrived at by measuring the grams of material involved per 100 milliliters of solution, in this case sulfite liquor employed.

The sulphite liquor may preferably contain a divalent alkaline earth sulfite acid base. In a preferred form, the invention comprises providing the combined $SO_2$ within a range of from about 0.7% to 0.4% based on the sulfite liquor, the total $SO_2$ within a range of from about 8% to 9%, the temperature within a range of from about 130° C. to 120° C., and the maximum pressure 100 p.s.i.g. In a further preferred form, the invention comprises providing the combined $SO_2$ within a range of from about 0.6% to 0.2% based on the sulfite liquor, the total $SO_2$ within a range of from about 10% to 16% based on the sulfite liquor, the temperature within the range of from about 130° C. to 120° C., and the maximum pressure 200 p.s.i.g.

By the practice of the process of the present invention, there is provided bleached dissolving wood pulp having characteristics not previously obtainable. The present process provides a bleached dissolving wood pulp having 90° light scatter value to below about 60.6 and a viscosity of at least about 100. In a preferred form the present invention further provides a bleached dissolving wood pulp having 90° light scatter value of about 31 and a viscosity of about 100.

Of the four sulfite pulping solution variables (i.e., free $SO_2$, combined $SO_2$, temperature, and pH), free $SO_2$ and temperature have received the most attention in the past. Relatively few studies have been concerned with low combined $SO_2$, obviously because a reduction of combined $SO_2$ was found early to lead to incomplete delignification and high proportions of undefibred wood residue. 4% combined $SO_2$ on wood is generally considered necessary for proper delignification. Information on the actual pH values in the digester under the conditions of the cook have become available only in recent years. Contrary to a commonly held notion, pressure is not a primary variable in sulfite cooking, but influences the concentration levels of free $SO_2$, bisulfite ions, and hydrogen ions in the pulping solution.

Sulfite pulping without a base has been attempted previously. In the most recent publication dealing with this subject (L. Stockman et al., Svensk Papperstidning 64 (1961), pp. 699–712), the optimum conditions found were: 95° C., 22% $SO_2$, 220 p.s.i.g., 8 hours for sulfonation of the lignin, followed by cooking with a solution of 5% $SO_2$ in water for 3 hours at 115° C. or 20 minutes at 145° C. Alternatively, pulp of acceptable quality was obtained from a single stage cook (combining sulfonation and hydrolysis) using the following conditions: 95° C., 36% $SO_2$, 350 p.s.i.g., 7 to 15 hours. It is evident from these data that, in the absence of the base ion, very high concentrations of $SO_2$ must be forcibly maintained in the pulping solution to render cooking feasible. Since it is necessary to increase the rate of delignification reactions by raising the reaction temperature, an impractical system pressure results as a consequence of the volatile nature of sulfur dioxide.

Certain considerations are basic to the present invention. The sulfonating agent, i.e., bisulfite ion, is available from two sources, (1) the dissociation of a metallic or ammonium bisulfite and (2) the dissociation of hydrated $SO_2$ (the traditional acid $H_2SO_3$ does not exist). Bisulfite ion from the first source is immediately available for sulfonation: $MeHSO_3 \rightarrow Me^+ + HSO_3^-$ (complete dissociation. The availability of $HSO_3$ ion from the second source depends on the concentration of free $SO_2$, temperature ($t$), pressure ($p$), and demand ($d$):

$$SO_2 \cdot H_2O \underset{t}{\overset{p \ d}{\rightleftharpoons}} HSO_3^- + H^+$$

The equilibrium constant,

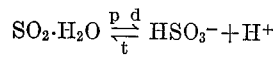

has a value of $1.7 \times 10^{-2}$ at room temperature and pressure and only $2.2 \times 10^{-4}$ at 150° C. and 100 p.s.i.g.

---

[1] The expression "combined $SO_2$" employed herein as to be construed in accordance with TAPPI Standard T 604 M-45 wherein the following is set forth:
"The free $SO_2$ is the actual free $SO_2$ plus half of the $SO_2$ in the bisulfites of calcium and magnesium, and is more properly called the 'available $SO_2$' as it indicates the $SO_2$ in excess of the amount necessary to form monosulfites. The combined $SO_2$ as above calculated represents the $SO_2$ combined as monosulfites, or in other words, is half of the $SO_2$ in the bisulfites of calcium and magnesium."

Although free $SO_2$ is a potential source of $HSO_3^-$ ion, available on demand through the above mechanism, experience shows that $HSO_3^-$ ions must be present at a certain concentration for adequate sulfonation. To produce this concentration in $SO_2$ solutions, it is necessary to use high pressures and/or low temperatures.

The approach taken in the process of the present invention can be described as the replacement of base ion-bound $HSO_3^-$ by hydrogen ion-bound $HSO_3^-$ at temperatures low enough to prevent lignin condensation due to high acidity, and at $HSO_3^-$ concentrations high enough to make sulfonation of lignin the preferred reaction. Under these conditions, very low pH can be maintained in the digester without harm and the cooking time decreases rather than increases, because the kinetic effect of temperature is over-compensated by the kinetic effect of hydrogen ion concentration.

The traditional explanation given for the sulfite delignification process is sulfonation followed by hydrolysis of the lignin complex. At the high concentration of hydrogen ions characteristic of the new process, it is possible that the shorter cooking time is due to the almost simultaneous occurrence of sulfonation and hydrolysis of lignin. Moreover, due to the high concentration of hydrogen ions and the low temperature, cooking liquor decomposition is at a minimum.

Another consideration is that, in a process of preparing cellulosic dissolving pulps from wood, it is desirable, from the point of view of both the economy and the efficiency of the process, to achieve the greatest possible amount of purification of the cellulose during the cooking stage. This purification goal must take into account that, conventionally, delignification improves with increasing base content of the pulping liquor, but that the pH rises simultaneously (unless held low by increasing the concentration of sulfur dioxide), and that it is desirable, in a dissolving pulp cook, to lower the pH level very considerably for the purpose of attacking hydrolytically undesirable carbohydrate material and existing cross linkages, without causing excessive damage to the cellulose proper, and without permitting condensation to impair the dissolution of lignin. It is possible to lower the pH in sulfite cooking by the use of strong mineral acids or their acid salts, but such measures have not led to the expected improvements in dissolving pulp quality, but have rendered the lignin more resistant to cooking.

By way of contrast, in the practice of the process of the present invention, when the base concentration in the liquor was drastically reduced and the cook made at considerably lower than normal temperature, the hydrogen ion concentration in the digester was increased up to 50 times without undue effects on delignification. When, at the same time, the concentration of sulfur dioxide was increased, the pH was lowered further and the rate of delignification rose substantially above that found in normal sulfite cooking.

For a better understanding of the present invention, reference should be had to the following examples thereof:

EXAMPLE I

A commercial sulfite digester equipped with forced circulation from the middle to both ends is filled with standard screened chips of Eastern Canadian black spruce while admitting steam from the bottom. During steaming, the chip charge compacts by its own weight and further chips are added at the top to fill the digester completely. The digester is then filled with calcium base acid containing 7% total $SO_2$ and 0.65% combined $SO_2$ and, after closing of the vent, the hydraulic pressure is increased to the cooking pressure of 95 p.s.i.g. The acid-to-wood ratio is about 3.8, combined $SO_2$ on wood about 2.3%. Maximum cooking temperature of 130° C. is reached in 4 hours through indirect heating. During the last hour of cooking, the pressure of the digester is gradually lowered to 40 p.s.i.g. Relief gases from the digester are used for cooking acid make-up.

Low combined calcium base cooking acid is prepared by diluting standard mill acid and fortifying it with $SO_2$ from both digester relief and external sources. Since the cooking temperature is low and the charge of free $SO_2$ high, the amount of free $SO_2$ in the spent liquor may be 5 times higher than from normal sulfite cooks. Recovery of $SO_2$ from low combined cooking acid is necessary for reasons of economy, air pollution, and use of spent liquor for fermentation. The improvements in acetate pulp quality due to this modification of the acid sulfite process are disclosed in Table II (FIG. 6).

EXAMPLE II

A 3 cu. ft. laboratory sulfite digester equipped with forced circulation is packed to the top with commercial spruce chips by using a wooden ram. After presteaming, cooking acid containing 0.4% combined $SO_2$ and 12 to 15% total $SO_2$ is filled to the top and additional acid is forced into the sealed vessel until the cooking pressure of 150 p.s.i.g. is reached. The acid-to-wood ratio is 4.2, combined $SO_2$ on wood is 1.7%. Maximum cooking temperature of 127° C. is reached in 3½ hours. Cooking at temperature continues for one hour and is followed by pressure relief during one hour to 45 p.s.i.g. before blowing.

Table I (FIG. 5) records the conditions used in sulfite cooks with and without base content. The first three lines show cooks without base, i.e. with $SO_2$ only, as reported by Stockman. In line 3, an acceptably short cooking time is obtained by use of 36% $SO_2$ solution but the corresponding pressure (350 p.s.i.g.) is quite impracticable. In the first two lines the pressure of 220 p.s.i.g. is still significantly above the maximum permissible in modern equipment (200 p.s.i.g.) but in spite of the long total treatment time the residual lignin, as shown by the Roe number of 3.5, is not sufficiently low for dissolving pulp.

The last three lines of Table I illustrate the profound influence of combined $SO_2$ which, as explained earlier, is needed for the creation of a high level of $HSO_3^-$ions, the effective agents in sulfonation. On the other hand, a high level of free $SO_2$ and high acidity (low pH) are needed to split off the sulfonated lignin and non-cellulosic substances. Such a compromise between free and combined $SO_2$ is shown in the next to last line. Pressure (95 p.s.i.g.) is suitable for ordinary pulping equipment and time is within the commercial range. Delignification (Roe No. 3.0) is adequate for dissolving pulp. If modern high-pressure equipment is available, a shorter cooking time may be achieved by using conditions illustrated in the last line.

Table II (FIG. 6) shows the influence of reduced combined $SO_2$ and increased free $SO_2$ in cooking on acetate properties obtained in an acetylation test as described by Herdle et al., Tappi 47,617 (1964). The increasing purity of the pulp with increasing acidity in cooking is apparent from this very sensitive test of color and turbidity, especially as shown by the light scatter. The figures for viscosity prove that this purification is secured without degradation of the cellulose.

In Table II (FIG. 6) the second cook employed 0.65% combined $SO_2$, and 7% total $SO_2$. This resulted in a pure pulp having a 90° scatter of 60.6 and a viscosity of 100. Also, in Table II, the third cook employed 0.4% combined $SO_2$, and 15% total $SO_2$. This resulted in a pure pulp having a 90° scatter of 31 and a viscosity of 100.

It should be explained at this point that, as an index of the suitability for the most exacting requirements of the product of the present process, turbidity as measured by the 90° light scatter of solutions made from such product has been adopted. Commonly, the turbidity of viscose or acetate solutions is estimated by an absorbance reading at 650 millimicrons. However, because of the yellowish color of such solutions, it is difficult to distinguish between absorbance and turbidity and such a reading will be a composite of light losses due to absorbance and scattering. By way of contrast, turbidity can also be determined by a combination of scattering and transmission measurements obtained at 90° and 0° angles. Here, an error introduced by absorbance can be corrected or, since the correction involved is less than 3% even for highly colored solutions, neglected. There is the limitation on this method that, in very turbid solutions, secondary scattering becomes significant, but this limitation does not come into play with the solutions here involved.

Although the studies leading to this invention were directed primarily toward the production of better acetylation pulps, beneficial effects on the properties of other types of dissolving pulps useful for the production of rayon and plastics were also observed. These effects include, particularly, improvements in filtration behavior, removal of low DP fractions in steeping, and rayon color.

Thus, the process of the present invention permits one to prepare dissolving pulps of improved purity and reactivity by the sulfite pulping process, using a much reduced concentration of combined sulfur dioxide, relatively low temperature, and a sufficient but not excessive concentration of free sulfur dioxide, at normal digester pressure and in equal or less time than normally required in cooks to similar pulp viscosity.

In the accompanying drawings, FIGS. 1 to 4, are based on many experiments including those given in Examples 1 and 2 and Tables I and II (FIGS. 5 and 6). They demonstrate the beneficial effects of the herein-disclosed novel combination of base concentration (combined $SO_2$), total $SO_2$ concentration, and temperature on cooking time and properties of the acetate made from the pulp produced by this cooking process and bleached by a method conventionally used for this pulp type.

FIG. 1 illustrates the influence of the combination of combined $SO_2$, total $SO_2$ and temperature on cooking time to achieve similar pulp viscosity (20 c.p.s.—Tappi T 230—0.5% CED). The reduction in cooking time with reduction in combined $SO_2$ and increase in total $SO_2$ when cooking at a maximum temperature of 123° C. is seen. The single point in the lower right portion of the graph representing a cook at 0.4% combined $SO_2$ (Ca base), 15% total $SO_2$, and 127° C. shows the continuation of this advantageous trend.

FIG. 1 confirms that an excellent sulfite dissolving pulp can be obtained from spruce and using calcium base in less than 6 hours total cooking time. The figure also shows that the effect of combined $SO_2$ on the rate of cooking is conspicuously absent at a cooking temperature of 147° C., partly because a considerable portion of the free $SO_2$ is relieved from the digester during the first half of the cook at a normal pressure setting of 95 p.s.i.g.

Figure 2:
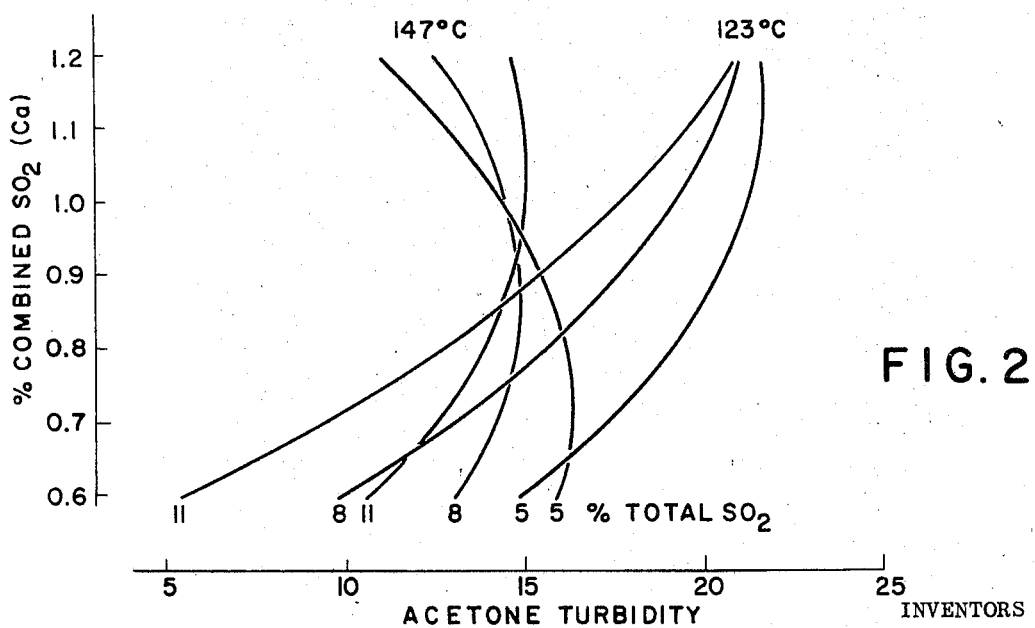
Figure 3:
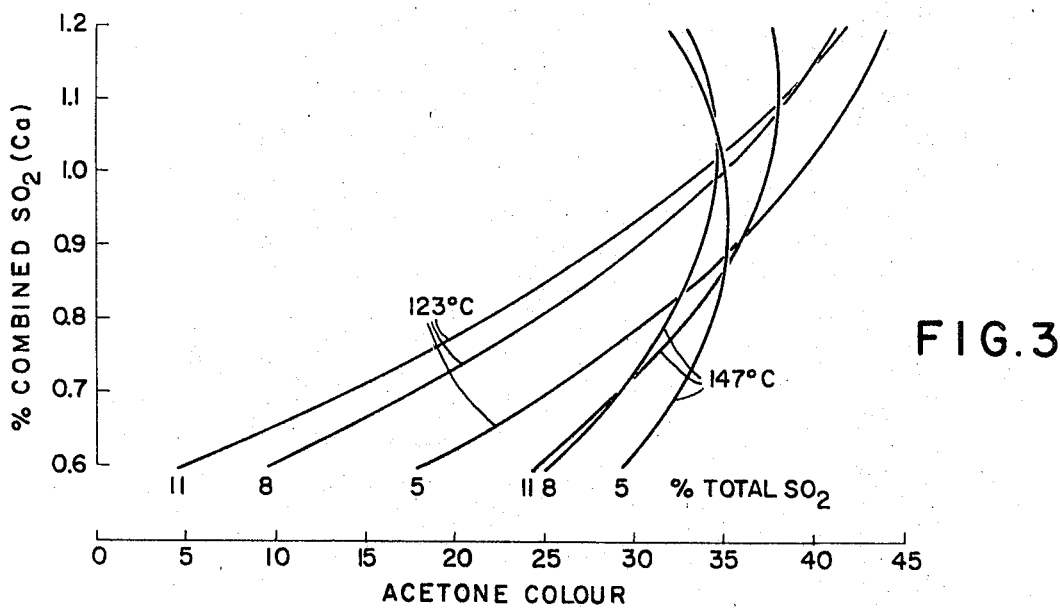
Figure 4:
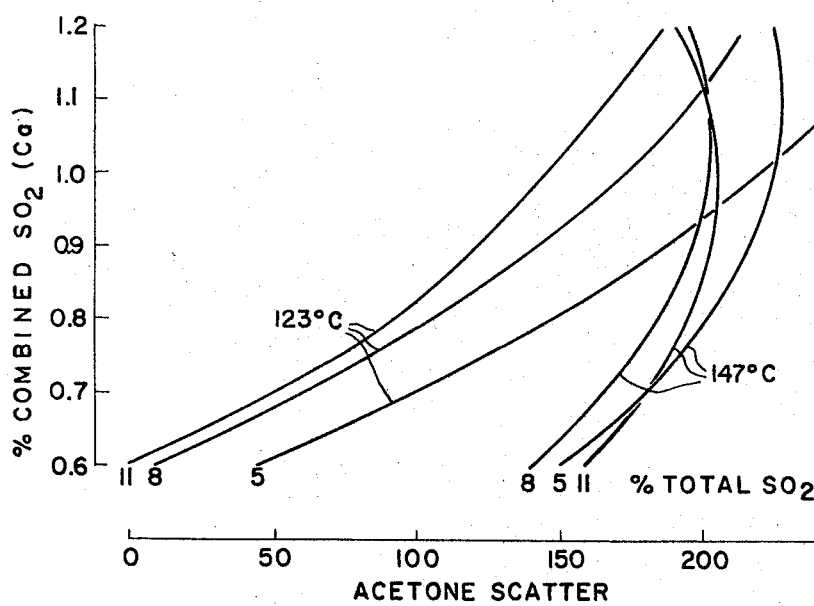

FIGS. 2, 3, and 4 illustrate the beneficial effects of three variables, i.e., total $SO_2$, combined $SO_2$ (Ca), and temperature, on the main properties of solutions of cellulose acetate (made from pulps produced in accordance with the present invention) in acetone. All three solution properties improve very significantly with decreasing combined $SO_2$ and cooking temperature, and further with increasing $SO_2$ concentration. The figures show clearly that the simultaneous variation of all three especially leads to the desired improvements and that optimum results occur at lower levels of combined $SO_2$ and temperature and higher levels of free $SO_2$.

Examples I and II, and FIGS. 1 to 6 serve to show that the preferred implementation of this invention involves the simultaneous variation of three cooking factors in the direction of lower combined $SO_2$, higher total $SO_2$, and lower cooking temperature to achieve progressively higher pulp quality without unfavorable effects on the cooking process. They also confirm that, for the specific woods there involved, the process of the present invention can confer a predetermined 90° light scatter value on an acetone solution of cellulose acetate of pulp made by such process if the process is manipulated in accordance with the following equation $$Y = 187.0 + 16.2a - 11.1b + 38.2c - 6.32a^2 + 4.70b^2 - 10.0c^2 + 4.38ab - 1.31ac - 3.63bc$$

wherein $Y = 90°$ light scatter value of an acetone solution of cellulose acetate make from the fully bleached pulp $$a = \frac{\text{maximum temperature} - 135°C.}{7}$$

$$b = \frac{\text{total } SO_2 - 8.00\%}{1.75}$$

and $$c = \frac{\text{combined } SO_2 - 0.90\%}{018}$$

More generally, improved acetylation pulp quality was achieved with decreasing concentration of base ion in systems containing any of the four bases ($Na^+$, $NH_4^+$, $Mg^{++}$, $Ca^{++}$) commonly employed in sulfite pulping. Significantly, the effect is independent of the amount of delignification achieved when cooking to a given viscosity. There is evidence, however, that bivalent cations of the alkaline earth family, when employed in low combined cooks, cause a greater improvement in acetate pulp quality than monovalent cations such as $Na^+$ or $NH_4^+$.

It is a feature of the process of the present invention that the rate of delignification, which normally decreases with decreasing concentration of combined $SO_2$, can be restored to normal, or even increased, by employing higher concentrations of sulfur dioxide at further reduced temperatures.

On the other hand, in order to utilize all the free $SO_2$ present in the digester for acidification and auxiliary sulfonation, it is necessary to operate a system filled with liquid. The practices of incompletely filled digesters (with gas space) and of "side relief" must be avoided. It was found that a combination of "topping-up" packing with pre-steaming of the chips led to practical liquor to wood ratios of 3.8 to 4.0 in mill digesters. In a hydrostatic system, pressures higher than the sum of the partial pressures of the components can be established without difficulty and maintained throughout the process.

The effect of "low combined" cooking on the dissolving, and particularly the acetylation, quality of pulps has been confirmed for various softwoods and there is no reason to believe that it would be lost in dealing with hardwoods, bagasse, or other cellulosic raw materials. Although the analytical pentosan content of unbleached and bleached pulps from dense eastern softwoods was not lowered greatly by "low-combined" cooking, the solubility of hemicellulose (mainly xylan) acetates in acetic acid was greatly increased. The results suggest that latent changes of the DP and structure of the hemicellulose polymers are introduced during the cooking stage, rendering the material more accessible and liable to degradation during acetylation. Such material is made soluble and removed during precipitation of cellulose acetate.

It is another feature of the "low-combined" cooking process that, due to the high acidity, dissolved carbohydrate fractions are much more degraded than in normal sulfite cooking. In fact, the waste liquors from "low-combined" cooks contain a higher concentration of fermentable sugars than any other type of sulfite cook.

The waste liquor from "low-combined" sulfite cooks contains several times the amount of free $SO_2$ found in waste liquor from ordinary sulfite cooks, varying with the amount of free $SO_2$ charged at the beginning and the temperature and pressure of the cook. In order to prevent contamination of the air and to realize fully the economy inherent in this process, sulfur dioxide must be recovered from the waste liquor. This becomes imperative if a fermentation unit is attached to the sulfite plant. Condensation of the gases recovered from the digester and the waste liquor will furnish liquid $SO_2$ to be returned to the cooking cycle.

What is claimed is:

1. A process for the manufacture of dissolving pulp from lignocellulosic raw material comprising the steps of (A) cooking comminuted cellulosic material in acid bisulfite liquor, wherein the initial conditions of combined $SO_2$, total $SO_2$, and temperature are selected, the combined $SO_2$ within a range of from about 0.7% to 0.2% based on the sulfite liquor, the total $SO_2$ within a range of from about 7 to 16% based on the sulfite liquor, and the temperature within a range from about 130° C. to 120° C., (B) bleaching the cooked material.

2. The process of claim 1 wherein the lignocellulosic raw material is wood.

3. A process as in claim 1 for cooking spruce wood in sulfite liquor to obtain pulp and to achieve a predetermined light scatter value Y for an acetone solution of cellulose acetate made from such pulp after full bleaching thereof comprising selecting the initial cooking conditions of combined $SO_2$, total $SO_2$, and temperature in accordance with the following equation $$Y = 187.0 + 16.2a - 11.1b + 38.2c - 6.32a^2 + 4.70b^2 - 10.0c^2 + 4.38ab - 1.31ac - 3.63bc$$

wherein $$a = \frac{\text{maximum temperature} - 135°\text{ C.}}{7}$$

$$b = \frac{\text{total } SO_2 - 8.00\%}{1.75}; \text{ and}$$

$$c = \frac{\text{combined } SO_2 - 0.90\%}{0.18}$$

4. The process of claim 1 wherein the sulfite liquor contains a divalent alkaline earth sulfite acid base.

5. The process of claim 1 wherein the combined $SO_2$ is within a range of from about 0.7% to 0.4% based on the sulfite liquor, the total $SO_2$ is within a range of from about 8% to 9%, the temperature is within a range of from about 130° C. to 120° C., and the maximum pressure is 100 p.s.i.g.

6. The process of claim 1 wherein the combined $SO_2$ is within a range of from about 0.6% to 0.2% based on the sulfite liquor, the total $SO_2$ is within a range of from about 10% to 16% based on the sulfite liquor, the temperature is within the range of from about 130° C. to 120° C., and the maximum pressure is 200 p.s.i.g.

References Cited

Casey, J. P.: Pulp and Paper, vol. I, 2nd ed., New York, Interscience, 1960, pp. 156–162, TS 1105 C 29 1960.

HOWARD R. CAINE, Primary Examiner

U.S. Cl. X.R.

162—83; 260—212